May 1, 1962 M. WERBLUD 3,032,415
METHOD OF PROCESSING RAW CHICKEN BY-PRODUCTS IN THE
PREPARATION OF FOOD FOR ANIMAL CONSUMPTION
Filed July 1, 1960
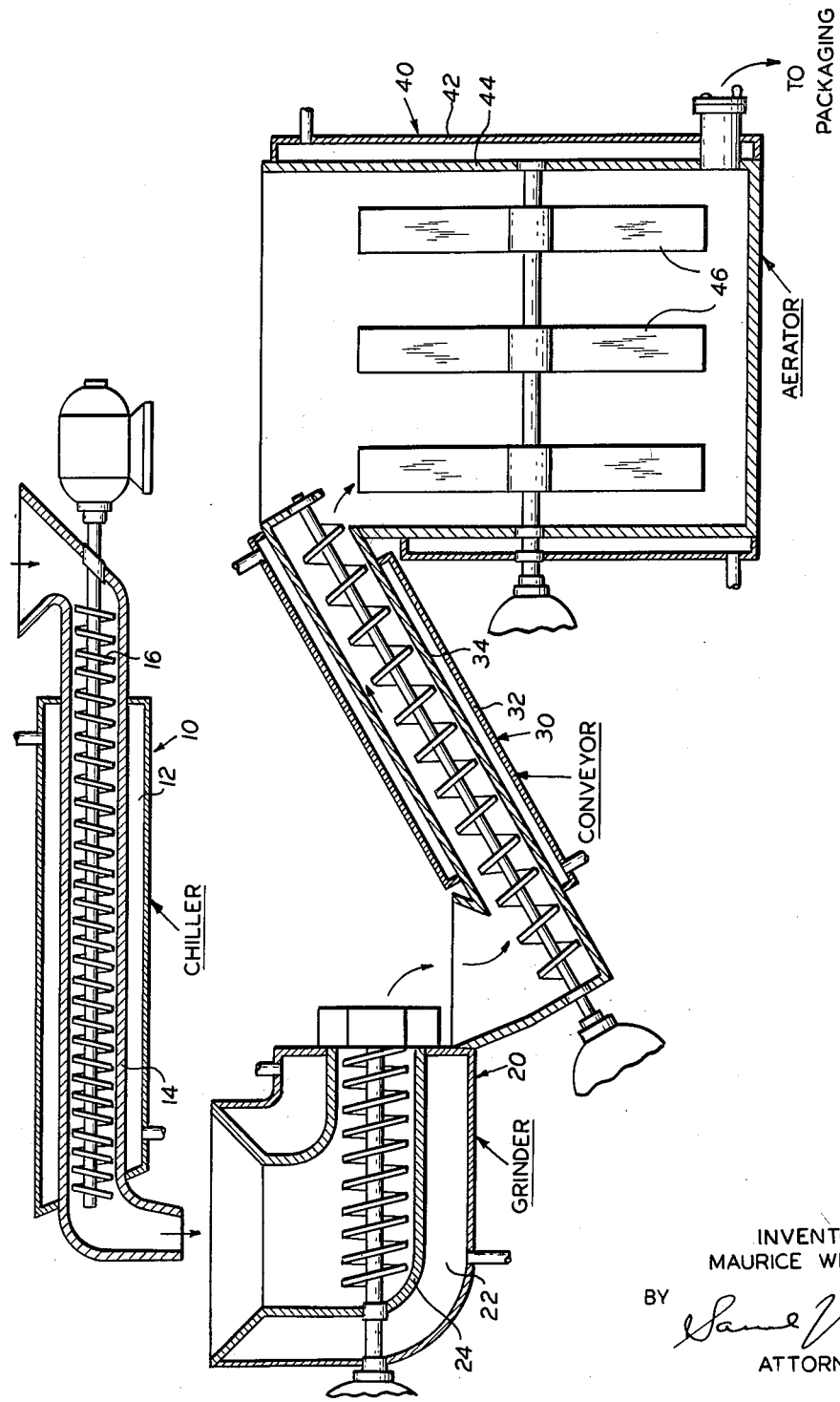
INVENTOR
MAURICE WERBLUD
BY
ATTORNEY.

United States Patent Office 3,032,415
Patented May 1, 1962

3,032,415
METHOD OF PROCESSING RAW CHICKEN BY-PRODUCTS IN THE PREPARATION OF FOOD FOR ANIMAL CONSUMPTION
Maurice Werblud, New York, N.Y., assignor to Netex Mink Ranches, Inc., New York, N.Y., a corporation of New York
Filed July 1, 1960, Ser. No. 40,353
4 Claims. (Cl. 99—7)

This invention relates to the processing of raw chicken by-products and waste products in order to prepare food suitable for animal consumption. Primarily it is intended to produce food suitable for use in connection with mink farming but this is not intended to limit the scope of the invention in any way whatsoever. The same food product would also be suitable for consumption by domestic animals or household pets such as dogs and cats. Similarly, although the invention is herein described mainly in terms of its application to chicken by-products and waste products, it will be understood that this is not intended by way of limitation of the scope of the invention. The invention is equally applicable to the offal of other varieties and species of fowl, such as turkeys, ducks, etc.

There are two conventional methods of processing chicken by-products in the preparation of food for animal consumption. One method consists of grinding and then freezing the offal (heads, feet and entrails). This is done preferably immediately after the chickens are slaughtered and the grinding operation occurs while the animal heat still remains in the offal. While this method retains most of the food value of these by-products, it does not succeed in driving off the odors, and this alone constitutes a very substantial disadvantage which militates against the use of said process.

The second conventional method commences with the steps of hashing and washing the offal. Subsequently, the material may be ground and it is then frozen. This process does remove the odor but it also produces a washed-out, pale food product which has lost much of its nutritive value. In a typical case, the protein analysis would be under 15% and more likely 13% or 14%.

The object of the present invention is the provision of a method of processing offal and like by-products and waste products of raw chicken or other fowl which eliminates offensive odors, retains substantially all nutritive values, and adequately preserves the processed material with an extremely low bacteria count.

In the present process the offal is not washed but, instead, is used in the very condition in which it is removed from the bird as soon as possible following slaughtering. The material is immediately reduced in temperature and is maintained at reduced temperature throughout the process. Since the material is at no time washed out (as in the second conventional process above described) there is no significant loss of nutritive value. Analysis shows a protein content in excess of 17% at the conclusion of the process herein described and claimed. Since the material is placed under refrigeration as soon as possible after slaughtering takes place, a rise in the bacteria count is promptly and automatically prevented. It has been found that material processed in accordance with the present invention has a bacteria count of approximately 31,000 per gram. The significance of this low count may be found in the fact that pasteurized milk has only a slightly lower count. Unpasteurized milk has a bacteria count of 200,-000. And, finally, the fact that the material is thoroughly aerated at a low temperature causes the material to lose its offensive odor so that when the process is completed there is practically no odor in the material and in this respect the result is similar to that attained with the hashing and washing process above described.

The invention is illustrated in the accompanying drawing which shows four motorized appliances utilized in carrying out the present process, the first being a refrigerated screw conveyor which is shown in vertical section, the second being a grinder which is shown in side elevation, the third being a refrigerated screw conveyor which is shown in vertical section and the fourth being a refrigerated mixer which is also shown in vertical section, said drawing constituting in effect a flow chart showing the various steps or stages in the process herein described and claimed.

The first step in the process herein claimed is to chill the offal as soon as possible after slaughtering. This does not necessarily require that the temperature be reduced to freezing or below. Instead, it is sufficient if the temperature be reduced from normal body heat to approximately 60 degrees above zero Fahrenheit. One method of achieving this result is to send the offal through a refrigerated screw conveyor 10 such as is shown in the drawing. This screw conveyor may be provided with a water jacket 12 through which cold water or a refrigerant passes. The inner wall 14 serves as a heat exchanger and the screw 16 moves the offal along said heat exchanger in order to reduce its temperature to approximately 60 degrees Fahrenheit. The length of the screw conveyor and the speed of rotation of its screw are determined by the single requirement that offal, deposited in the receiving end of the screw conveyor at body temperature, is discharged through the outlet end at a temperature of approximately 60 degrees Fahrenheit. The first step can also be accomplished by icing the product.

The second step is to grind the chilled offal and this is done in motor-driven grinder 20. Preferably, this grinder should be adjustable so as to grind the offal to the particle size required. Grinder 20 may also be refrigerated and more particularly provided with a water jacket 22 through which cold water or a refrigerant may circulate in order to maintain the material within the grinder at a relatively low temperature. The inner wall 24 of the grinder serves as a heat exchanger between the material being ground and the cold water or refrigerant. It will be understood that the grinding operation takes but a relatively brief period of time and the heat generated thereby would normally but slightly raise the temperature of the material being ground. Such rise in temperature would not ordinarily have any significance in the present procedure and consequently it would be entirely feasible, although not necessarily preferable, to utilize an unrefrigerated grinder in the place of the refrigerated grinder 20 shown in the drawing.

The third step in the process herein claimed is to deliver the ground offal to a mixer and this is done by means of a refrigerated feed screw 30. This screw has a water jacket 32 through which cold water or a refrigerant may be circulated in order to lower the temperature of the offal or to maintain it at a low temperature. The inner wall 34 of said water jacket serves as a heat exchanger, said inner wall being also the outer wall of the feed screw. The ground offal is maintained at a temperature of between 55 and 60 degrees Fahrenheit in its passage through the feed screw. Should it happen that the offal enters the feed screw at a temperature higher than 60 degrees Fahrenheit by reason of the heat generated in the grinding operation, its temperature will be reduced to between 55 and 60 degrees Fahrenheit in its passage through the feed screw.

The fourth and most important step in the process is the mixing or agitating step in which the ground offal is thoroughly aerated and deodorized. This step takes place in a motorized mixer or agitator 40 having a water jacket 42 in the cold water or a refrigerant may circulate to cool or refrigerate the contents of said mixer. The inner wall 44 of the water jacket, which is also the outer wall of the mixer, is the heat exchanger through which heat is removed from the offal and carried away by the refrigerant. The ground offal is mixed or agitated in said mixer for a period of approximately two hours during which time its temperature is lowered to about 50 to 55 degrees Fahrenheit. All undesirable odors are removed in consequence of this operation and the material is now ready for the next stage in the procedure which is the packing stage.

The ground, deodorized and chilled or refrigerated offal may now be packed in any suitable type of container, for example, corrugated boxes adapted to receive approximately 40 pounds of material. A blast or sharp freeze is now applied to the packaged material in order to reduce its temperature to below freezing. The material will now be preserved until it is used.

As has above been indicated, raw offal thus processed is highly fit for animal consumption. Its bacteria count is only 31,000 per gram, this being the lowest bacteria count of any animal food prepared from raw offal or the like. It is free of offensive odors and is quite palatable to carniverous animals such as mink, dogs and cats. The protein analysis of such food exceeds 17% and therefore it possesses good nutritive value.

It will be understood that the drawing merely illustrates the essential steps in the process. It is important to understand that the invention is not limited to the specific appliances shown in the drawing. For example, agitator 40 is shown to have a screw type of agitating element 46. This is not an essential feature of the invention and any conventional agitator or mixer may be used provided that it is open to the air so that the product not only is thoroughly mixed but is also aerated at the same time. Similarly, grinder 20 is shown to be a screw type appliance but this, too, is purely illustrative and any suitable form of conventional grinder may be used for the purposes of this invention. Nor is the use of a cold water refrigerant jacket an essential element of the invention. Any suitable cooling or refrigerating means may be used to accomplish the same result.

I claim:

1. A method of processing raw offal in the preparation of food fit for animal consumption, comprising the steps of chilling and removing the animal heat from the offal promptly following slaughter, grinding the offal, chilling the ground offal, refrigeratively mixing and aerating the chilled, ground offal while further reducing its temperature in order to deodorize it, and finally freezing the chilled, deodorized offal in order to preserve it.

2. A method of processing raw offal in the preparation of food fit for animal consumption, comprising the steps of chilling and removing the animal heat from the offal promptly following slaughter, grinding the offal without significantly raising its temperature, chilling the ground offal to a temperature of approximately 55 to 60 degrees Fahrenheit, refrigeratively mixing and aerating the chilled, ground offal while further reducing its temperature to approximately 50 to 55 degrees Fahrenheit in order to deodorize it, and finally freezing the chilled, deodorized, ground offal in order to preserve it.

3. A method of processing raw offal in the preparation of food fit for animal consumption, comprising the steps of chilling and removing the animal heat from the offal promptly following slaughter and reducing its temperature to approximately 60 degrees Fahrenheit, grinding the offal while maintaining its temperature at approximately 60 degrees Fahrenheit, chilling the ground offal and reducing its temperature to approximately 55 to 60 degrees Fahrenheit, mixing and aerating the chilled, ground offal while further reducing its temperature to approximately 50 to 55 degrees Fahrenheit in order to deodorize it, and finally freezing the chilled, deodorized, ground offal in order to preserve it.

4. A method of processing raw offal in the preparation of food fit for animal consumption, comprising the steps of quickly chilling the offal to a temperature of approximately 60 degrees Fahrenheit promptly following slaughter, grinding the offal while preventing its temperature from rising significantly above 60 degrees Fahrenheit, further chilling the ground offal and reducing its temperature to approximately 55 to 60 degrees Fahrenheit, mixing and aerating the chilled, ground offal while still further reducing its temperature to approximately 50 to 55 degrees Fahrenheit in order to deodorize it, and finally quickly freezing the chilled, deodorized, ground offal in order to preserve it.

References Cited in the file of this patent

UNITED STATES PATENTS

| 1,421,283 | Meakin | June 27, 1922 |
| 2,329,226 | Stafford et al. | Sept. 14, 1943 |
| 2,583,964 | Otter | Jan. 29, 1952 |